US009320198B2

(12) United States Patent  
Trowbridge et al.

(10) Patent No.: US 9,320,198 B2  
(45) Date of Patent: Apr. 26, 2016

(54) SYSTEM AND METHOD FOR CONTROLLING A DRAPER HEADER DURING AND AFTER A DESLUGGING OR CLEAN OUT OPERATION

(75) Inventors: Jeffrey C. Trowbridge, Stevens, PA (US); Andrew R. Wilbert, Walworth, NY (US)

(73) Assignee: CNH Industrial America LLC, New Holland, PA (US)

( * ) Notice: Subject to any disclaimer, the term of this patent is extended or adjusted under 35 U.S.C. 154(b) by 195 days.

(21) Appl. No.: 14/127,806

(22) PCT Filed: May 31, 2012

(86) PCT No.: PCT/US2012/040245  
§ 371 (c)(1),  
(2), (4) Date: Jun. 6, 2014

(87) PCT Pub. No.: WO2012/166947  
PCT Pub. Date: Dec. 6, 2012

(65) Prior Publication Data  
US 2014/0290200 A1    Oct. 2, 2014

Related U.S. Application Data

(60) Provisional application No. 61/491,529, filed on May 31, 2011.

(51) Int. Cl.  
*A01D 69/06* (2006.01)  
*A01D 75/18* (2006.01)  
*A01D 41/127* (2006.01)

(52) U.S. Cl.  
CPC .......... *A01D 75/182* (2013.01); *A01D 41/1274* (2013.01)

(58) Field of Classification Search  
CPC ... A01D 57/20; A01D 41/142; A01D 61/008; A01D 41/14; A01F 29/19; A01F 29/14; F16H 2037/088  
USPC ........... 701/50; 56/181, 11.9, 192, 10.9, 11.2; 60/484  
See application file for complete search history.

(56) References Cited

U.S. PATENT DOCUMENTS

| | | | |
|---|---|---|---|
| 2,749,696 A | | 6/1956 | Innes |
| 3,214,002 A | * | 10/1965 | Kirkpatrick et al. ....... 198/369.7 |
| 4,337,611 A | | 7/1982 | Mailander et al. |
| 4,429,517 A | * | 2/1984 | Lohrentz et al. ................ 56/181 |
| 4,512,140 A | * | 4/1985 | Blakeslee ....................... 56/11.6 |
| 4,519,190 A | * | 5/1985 | Blakeslee ....................... 56/181 |
| 4,522,018 A | | 6/1985 | Blakeslee |
| 4,590,751 A | * | 5/1986 | Stephenson ..................... 56/192 |
| 4,938,010 A | * | 7/1990 | Guinn et al. .................... 56/181 |

(Continued)

FOREIGN PATENT DOCUMENTS

GB        2035029        6/1980

*Primary Examiner* — Árpád Fábián-Kovács  
(74) *Attorney, Agent, or Firm* — Patrick M. Sheldrake

(57) ABSTRACT

A system and method of operation of a draper header of an agricultural work machine during a deslugging or clean out operation and after resumption of normal crop processing. During the deslugging or clean out operation, a feed draper is reversed or paused and the at least one side draper is paused. The method includes automatically resuming operation of the feed draper and at least one side draper in a graduated progression for more efficient clearing of the slug or blockage of crop material.

20 Claims, 14 Drawing Sheets

(56) References Cited

U.S. PATENT DOCUMENTS

| | | | |
|---|---|---|---|
| 5,086,613 A | 2/1992 | Fox et al. | |
| 5,272,860 A * | 12/1993 | Baril et al. | 56/366 |
| 5,462,486 A * | 10/1995 | Norton | 460/20 |
| 5,791,128 A | 8/1998 | Rogalsky | |
| 6,205,757 B1 * | 3/2001 | Dow et al. | 56/366 |
| 6,318,056 B1 | 11/2001 | Rauch et al. | |
| 6,381,932 B1 | 5/2002 | Clauss | |
| 6,393,813 B1 | 5/2002 | Nowak | |
| 6,817,166 B2 | 11/2004 | Dunn | |
| 7,140,169 B2 | 11/2006 | Ameye et al. | |
| 7,452,267 B2 | 11/2008 | Bundy et al. | |
| 7,467,505 B2 * | 12/2008 | MacGregor | 56/11.9 |
| 7,497,069 B2 | 3/2009 | Enns et al. | |
| 7,632,179 B2 | 12/2009 | Brome et al. | |
| 8,206,205 B2 | 6/2012 | Derscheid | |
| 2005/0014603 A1 | 1/2005 | Brome et al. | |
| 2005/0284124 A1 * | 12/2005 | Patterson | 56/364 |
| 2006/0213168 A1 | 9/2006 | Remillard et al. | |
| 2010/0287902 A1 * | 11/2010 | Derscheid | 56/341 |

* cited by examiner

SYSTEM AND METHOD FOR CONTROLLING A DRAPER HEADER DURING AND AFTER A DESLUGGING OR CLEAN OUT OPERATION

This application is the US National Stage for International Application No. PCT/US2012040245, filed on May 31, 2012, which itself is related to and claims the benefit of U.S. Provisional Application No. 61/491,529 filed on May 31, 2011.

TECHNICAL FIELD

This invention relates generally to an agricultural harvesting machine and more particularly to a system and method of operation of a draper header during and after a deslugging or clean out operation, including automatically pausing or reversing operation of a feed draper and at least one side draper and automatically resuming operation of the feed draper and the at least one side draper in a graduated progression for more efficient clearing of the slug or blockage of crop material.

BACKGROUND ART

The disclosure of U.S. Provisional Application No. 61/491, 529, filed May 31, 2011, is hereby incorporated herein in its entirety by reference.

Agricultural harvesting machines, such as combines, comprise a variety of apparatus and systems for receiving and processing crops. In particular, a combine will include a header operable for severing crops and other plant material from root structure and conveying the severed crop and plant material to a feed mechanism of the combine. The feed mechanism will typically include an enclosed feeder housing containing a feed conveyor, which feed conveyor will typically include parallel chains connected by slats, which chains encircle sprockets which are driven by a feeder drive to move the chains and slats upwardly and rearwardly along a floor of the housing, for inducting and conveying the crop and plant material, as well as debris that may be contained therein, into an inlet region of a threshing system of the combine. The threshing system, in turn, will typically include at least one rotor rotatable within a cavity or space defined at least partially by a concave structure having an array or arrays of openings therein sized for passage of grain therethrough. The rotor will include elements for inducting the crop and other material into the cavity and conveying the material through a crop separation clearance between the outer region of the rotor and the inner region of the concave, for separating grain and other small elements of the crop material from larger elements thereof, typically including leaves, stalks, cobs, husks and the like, depending on the crop being harvested. The separated grain is then expected to pass through the openings of the concave for further processing.

From time to time during operation of an agricultural combine, a slug, that is, an incorrectly processed and/or compacted mass of crop material and/or weeds, particularly stringy or viny weeds, debris, or other material, may be inducted into the feed mechanism and/or the threshing mechanism and become lodged or packed or jammed, to possibly block or interrupt throughput of crop material through the combine, and/or damage components of the feed and/or threshing mechanism, thus necessitating removal of the blockage or slug. Thus, when the combine encounters a slug of crop which plugs the draper sickle knife, feed draper, feed auger, feeder house, or threshing rotor, the operator must stop the normal forward feeding of crop and momentarily reverse the feeding mechanisms in an attempt to break up the slug of crop and eventually continue harvesting.

Once a slug has developed in the crop processing mechanism which refers to the feed mechanism and the threshing mechanism of the combine, a number of different actions depending on, the combine status, the type, severity and location of the slug, may be necessary to effect removal of the slug. These actions in response to encountering a slug or blockage of crop material may be performed by the operator, selected by the operator from a number of predetermined deslugging routines, or automatically run as a function of sensed parameters representative of the type and location of the slug or blockage. One such system and method is described in Bundy et al., U.S. Pat. No. 7,452,267 issued Nov. 18, 2008 to CNH America LLC which is herein incorporated by reference.

Actions in response to a blockage or slug in the crop processing mechanism may only entail backing the slug or blockage away from the mechanism at which it became lodged, sufficiently so as to break it up or better process or compact it for passage through the feed and/or threshing mechanism. A slug or blockage that cannot be sufficiently broken up to pass through the mechanism may be carried off the front of the header by reversing one or both mechanisms to discharge the slug or blockage onto the feed draper and reversing the feed draper to carry the slug or blockage from the front of the header.

For a slug or blockage in the threshing mechanism, it may be sufficient to repeatedly jog the rotor through small angular movements, until the resulting low impulsive loads break down the slug and free it. In a more extreme example, it may be necessary to rock the rotor more violently back and forth in an agitating motion, at different amplitudes and different frequencies, occasionally with an asymmetric motion and relatively large impulsive loads, for extended periods of time, to incrementally dislodge or work the slug free. In an even more extreme example, manual intervention may be required, to open up the feed mechanism and/or the threshing mechanism, and manually clear the slug piece by piece.

Once the slug or blockage has been cleared, normal crop processing resumes and the draper header again conveys crop material to the feed mechanism. The distribution of the crop material on the feed and side drapers at this point depends on their operation during the deslugging operation. For example, if the feed and side drapers continue in their normal operating direction during the deslugging process, the side belts continue to add more crop material to the center belt which is counterproductive to the unplugging process. In other words, crop material distributed along the side drapers when the combine stopped harvesting is fed onto the feed draper and toward the inlet of the feeder housing. When normal operation resumes, all of the crop material that was distributed along the draper header simultaneously enters the feed mechanism, potentially leading to another blockage. As another example, if reverse operation of the feed and side drapers is disabled during the deslugging operation, the operator will not have the option of discharging a slug from the front of the header. Another option is to reverse both the feed and the side drapers during the deslugging operation. Reference in this regard, Enns et al., U.S. Pat. No. 7,497,069 issued on Mar. 3, 2009 to MacDon Industries Ltd., which describes a hydraulic circuit that reverses both the feed and side drapers during reverse operation of the feed and/or threshing mechanism. Reversing the feed draper, when not clearing a slug or blockage from the front of the header, results in unnecessary loss of the crop material on the feed draper when harvesting stopped. In addition, reversing the side drapers results in accumulation of the crop material on the side drapers at the outer ends thereof that will later be fed into the feed mechanism potentially leading to another blockage.

Accordingly, what is sought is a system and method for operating a draper header during and subsequent to a slug clean out operation, which provides one or more of the capabilities and overcomes at least one of the problems, shortcomings or disadvantages as set forth above.

SUMMARY OF THE INVENTION

What is disclosed is a system and method for operating a draper header during and subsequent to a slug clean out operation, which provides one or more of the capabilities and overcomes at least one of the problems, shortcomings or disadvantages as set forth above.

A draper header of an agricultural harvesting includes a feed draper configured and operable for conveying crop material thereon in a feed direction toward a crop processing mechanism of the harvesting machine and a reverse direction away from the crop processing mechanism. The header also includes at least one side draper configured and operable for conveying crop material thereon in a sideward direction to the feed draper. The crop processing mechanism includes a feed mechanism and a threshing mechanism, and operation of the crop processing mechanism in a deslugging or clean out process includes operating the crop processing mechanism in a reverse direction and a feed direction for movement of crop material in a reverse direction and a feed direction, respectively.

According to a preferred embodiment of the invention, in response to operation of the crop processing mechanism in the reverse direction, the operation the feed draper and the at least one side draper in the feed direction is automatically paused. After the deslugging or clean out operation, the crop processing mechanism is operated in the feed direction. In response to operation of the crop processing mechanism in the feed direction for a first predetermined period of time, operation of the feed draper is automatically resumed in the feed direction for conveying crop material in the feed direction. In response to operation of the crop processing mechanism in the feed direction for a second predetermined period of time, longer than the first predetermined period of time, operation of the at least one side draper is automatically resumed in the feed direction for conveying crop material in the feed direction toward the feed draper. In addition, in response to operation of the crop processing mechanism in the reverse direction for a third predetermined period of time, the feed draper is automatically operated in the reverse direction to convey crop material thereon in the reverse direction.

According to a preferred feature of the invention, when the crop processing mechanism is operated in the reverse direction, the feed draper remains paused until the crop processing mechanism is operated in the feed direction for the first predetermined period of time, indicating the deslugging operation broke apart or compacted the slug sufficiently for normal crop processing to resume. In this case, the feed draper resumes operation in the feed direction, and after the second predetermined period of time the at least one side draper resumes operation in the feed direction. Alternately, the feed draper remains paused until the crop processing mechanism is operated in the reverse direction for the third predetermined period of time, indicating the slug has been discharged onto the feed draper and should be conveyed from a forward end of the header. In this case, the feed draper resumes operation in the reverse direction until the slug of crop material is discharged from the forward end of the header.

According to a preferred aspect of the invention, the first predetermined period of time is sufficient to allow the crop processing mechanism to process at least a portion of the crop material therein.

According to another preferred aspect of the invention, the second predetermined period of time is sufficient to allow the feed draper to convey at least a portion of crop material thereon to the feed mechanism.

According to another preferred feature of the invention, at least one slug clean out operation includes operation of the crop processing mechanism in alternating reverse and feed directions for variable durations. Accordingly, the first predetermined period of time is longer than the variable durations of operation in the feed direction, and the third predetermined period of time is longer than the variable durations of operation in the reverse direction of the at least one slug clean out operation. This will prevent the header from misinterpreting the repeated reversals of direction of the crop processing mechanism during the slug clean out operation.

According to yet another preferred feature of the invention, the variable durations of operation of the crop processing mechanism in the feed direction and the reverse direction are predetermined.

According to yet another preferred feature of the invention, the variable durations of operation of the crop processing mechanism in the feed direction and the reverse direction are selected by an operator.

According to yet another preferred feature of the invention, the variable durations of operation of the crop processing mechanism in the feed direction and the reverse direction are automatically determined by parameters of the at least one slug clean out operation.

According to yet another preferred aspect of the invention, the header further includes an auger disposed near a rear end of the feed draper, and operation of the auger is resumed after the second predetermined period of time.

According to yet another preferred aspect of the invention, operation in the feed direction conveys the cut crop material sidewardly on the at least one side draper to the feed draper, along the feed draper to a feed conveyor within a feeder housing of the feed mechanism, through feed mechanism to the threshing mechanism including a rotor and concave, through the threshing mechanism for further cleaning and processing in the agricultural harvesting machine.

Preferred embodiments of the system of the invention comprise hydraulic embodiments and electromechanical embodiments.

DETAILED DESCRIPTION OF THE INVENTION

Figure 1:
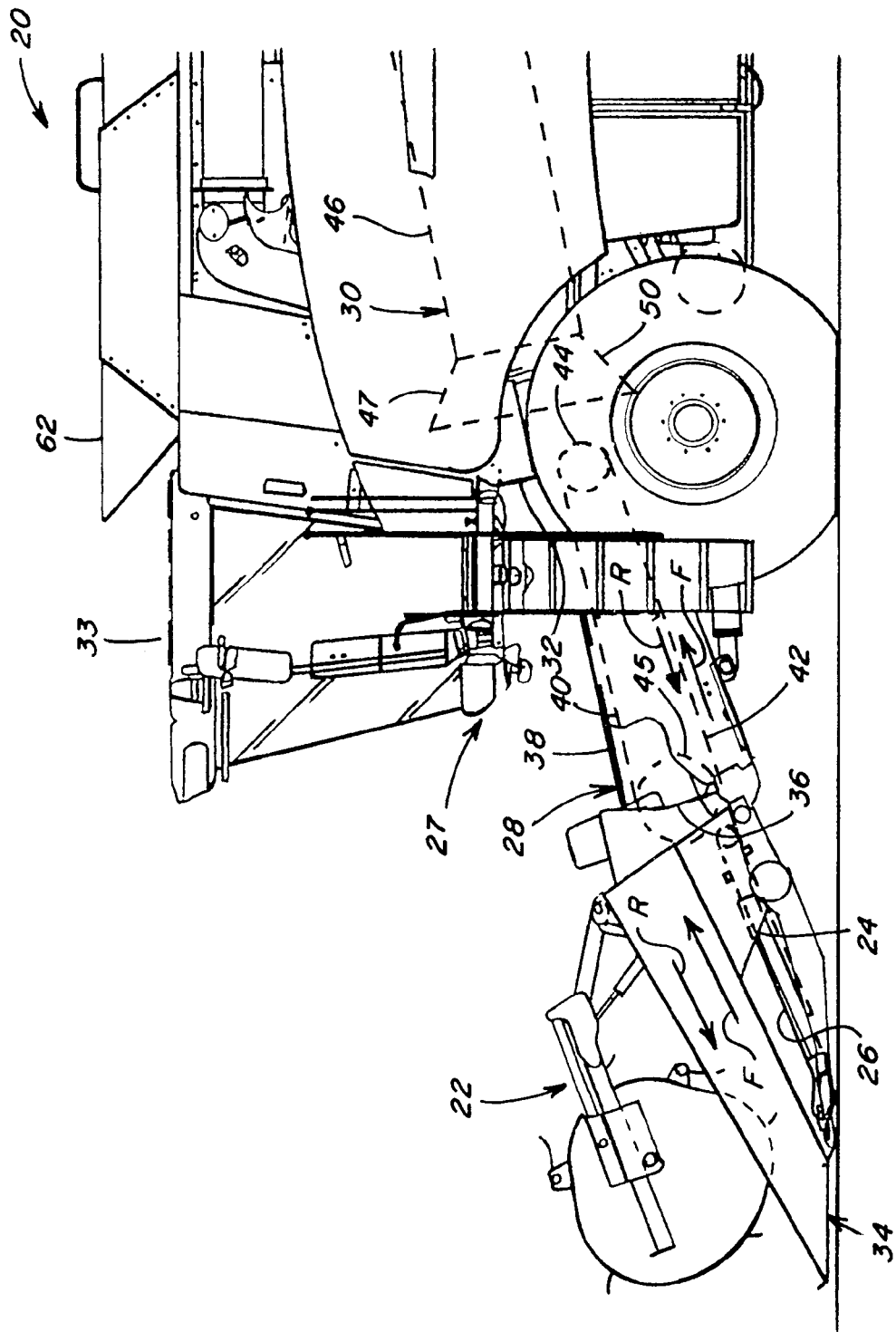
FIG. 1 is a side view of an agricultural combine including a crop processing mechanism, which includes a feed mechanism and a threshing mechanism and a draper header including a feed draper and side drapers for use with the system and method of the invention.

Referring now to the drawings, wherein FIG. 1 depicts a representative agricultural harvesting machine, shown here as a combine 20, having a draper header 22 and a crop processing mechanism 27, including a feed mechanism 28 and a threshing mechanism 30. Although illustrated with a draper type header, the present invention is suitable for a header using alternate conveyance systems, such as, but not limited to, an auger. In addition, the present invention is suitable for use with a windrowing type machine wherein the severed crop material is discharged from the rear of the machine.

Figure 3:
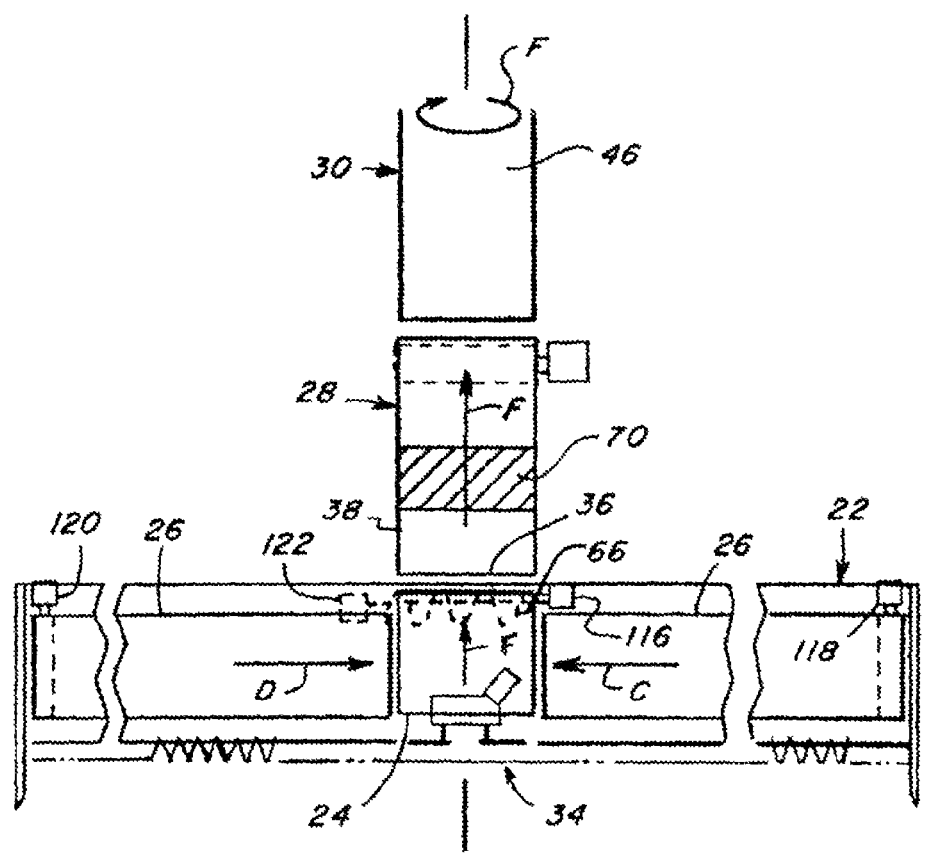
FIG. 3 is a simplified top view of the header, the feed mechanism, and a portion of the threshing mechanism of the combine of FIG. 1, illustrating a slug or blockage of crop material in the feed mechanism.

Referring also to FIG. 3, draper header 22 is mounted on a forward end 36 of feed mechanism 28, and is operable for cutting or severing plant material or crops such as, but not limited to, small grains such as wheat and soybeans, and conveying the severed crop material toward an inlet opening of feed mechanism 28 for conveyance into combine 20 for threshing and cleaning, in the well known manner, as combine 20 moves forwardly over a field. Draper header 22 includes a feed draper 24 configured and operable for conveying crop material thereon in a feed direction, denoted by arrow F, toward feed mechanism 28, and a reverse direction, denoted by arrow R, away from feed mechanism 28 or toward a forward end 34 of header 22, and at least one side draper 26 configured and operable for conveying crop material thereon in a sideward feed direction denoted by arrows C and D to feed draper 24.

Feed mechanism 28 is mounted on a front end 32 of combine 20 generally beneath an operator cab 33. Feed mechanism 28 includes a feeder housing 38 containing a feed conveyor 40 operable for conveying the crop material upwardly and rearwardly through housing 38 into an inlet region of threshing mechanism 30. Feed conveyor 40 generally includes at least two endless chains 42 encircling drive sprockets 44 located in a rear end of feeder housing 38 and a drum 45 located in forward end 36 of feed mechanism 28. A plurality of slats (not shown) extends between chains 42 and facilitates the conveying of crop and other material through feeder housing 38, in the well-known manner. In this latter regard, during normal crop processing, drive sprockets 44 will be rotated in a counterclockwise direction for moving chains 42 and the slats upwardly and rearwardly within feeder housing 38 for conveying crop and other plant material upwardly and rearwardly toward threshing mechanism 30 in feed direction F. Alternately, when reversed, drive sprockets 44 will be rotated in a clockwise direction for moving chains 42 and slats downwardly and forwardly within feeder housing 38 for conveying crop and other plant material away from threshing mechanism 30 in reverse direction R.

Figure 2:
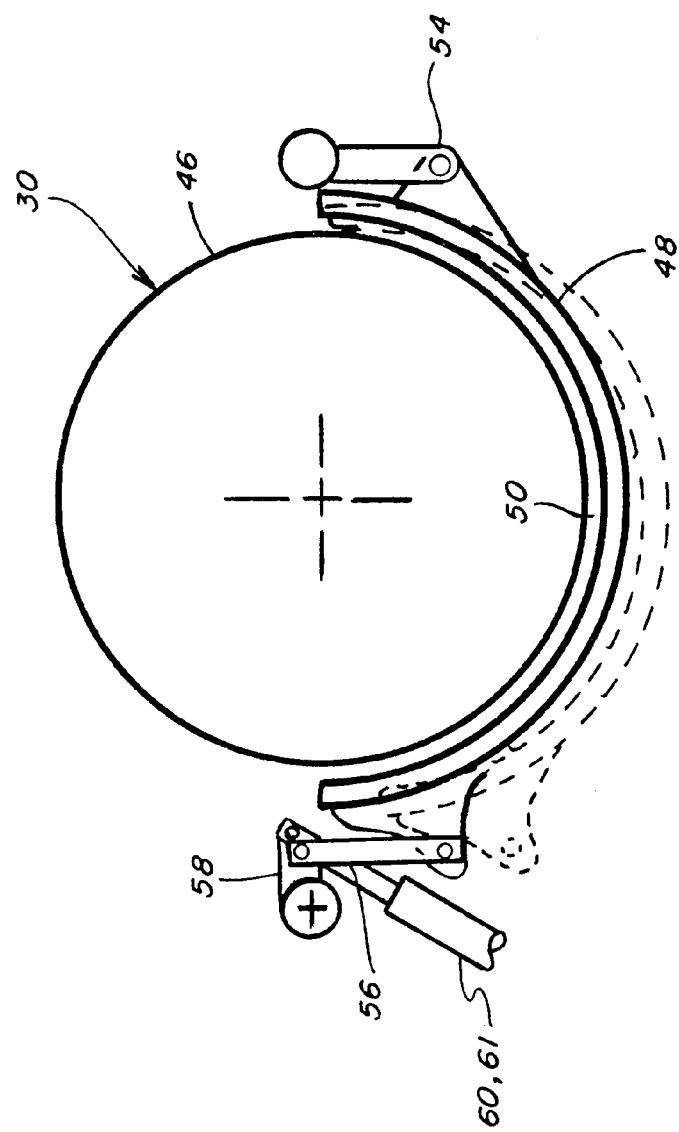
FIG. 2 is a simplified end view of a rotor and a concave of the threshing mechanism of the combine of FIG. 1, illustrating the crop separation clearance between the rotor and the concave.

Referring also to FIG. 2, threshing system 30 includes a rotatable, generally cylindrical rotor 46 including a tapered forward end having at least two vanes or flights 47 (FIG. 1) extending radially outwardly therefrom. At least a lower region of rotor 46 rearwardly of flights 47 is surrounded by a concave 48 located in radially outwardly spaced relation thereto, defining a crop separation clearance 50 extending circumferentially at least partially around the outer cylindrical surface of rotor 46. Referring more particularly to FIG. 2, concave 48 is supported beneath rotor 46 by a support structure including a pivotal connection 54 on one side, and one or more hanger straps 56 on the other side. Hanger strap 56 is connected to a free end of an adjusting arm 58 supported and controllably movable upwardly and downwardly by an actuator 60, which can be, for instance, a fluid cylinder. Actuator 60 is of well-known, conventional construction, and can be controlled by an operator using a control (not shown) in the well-known manner to precisely position concave 48 within a range of relatively more closely spaced positions in relation to rotor 46 (represented in solid lines) to provide a crop separation clearance suitable to for desired threshing characteristics for the crop to be harvested. The position of concave 48 can be sensed or determined in the conventional, well known manner using a concave position sensor 61, which can be associated with or incorporated into actuator 60, or located elsewhere for sensing information representative of the position of concave 48 relative to rotor 46. This position and/or the crop separation clearance may be indicative of the presence of a slug or blockage of crop material. Actuator 60 can also be controlled in the same manner to position concave 48 in at least one more lowered position (represented in dotted lines) wherein the crop separation clearance is opened so as to be suitable for facilitating slug clean out operations in threshing mechanism 30.

As combine 20 is moved forwardly through a field for normal crop processing, crops and other plants severed by header 22 will be conveyed to feed mechanism 28, and through feed mechanism 28 to threshing mechanism 30, wherein a mat of the crop and other plant material will move in a generally helical path through crop separation clearance 50, as effected by rotation of rotor 46. Grain and other small elements of plant material will then pass through arrays of openings or spaces in concave 48, so as to fall therefrom onto a cleaning system (not shown) of combine 20, which will further clean the grain from the other small elements of plant material. From the cleaning system, the clean grain will be conveyed into a clean grain tank 62, in the well-known conventional manner. Larger elements of plant material, such as straw, leaves, stalks, cobs, and the like, which do not pass through the openings of concave 48 are conveyed through crop separation clearance 50 past the rear end of rotor 46 and concave 48, and are disposed of through the rear end of combine 20, also in the well-known manner.

Referring also to FIGS. 3 through 8, when an operator and/or a slug detection system detects a slug 70 or blockage of crop material in feed mechanism 28 and/or threshing mechanism 30, combine 20 stops normal crop processing for a slug clean out operation for eliminating slug 70 or the blockage of crop material. Slug clean out operations typically initiate by operating crop processing mechanism 27 in reverse and may alternately switch the operation of crop processing mechanism 27 between reverse and feed directions to free slug 70 as illustrated by arrow 75 in feed mechanism 28 and arrow 77 at rotor 46 in FIG. 4.

Figure 8:
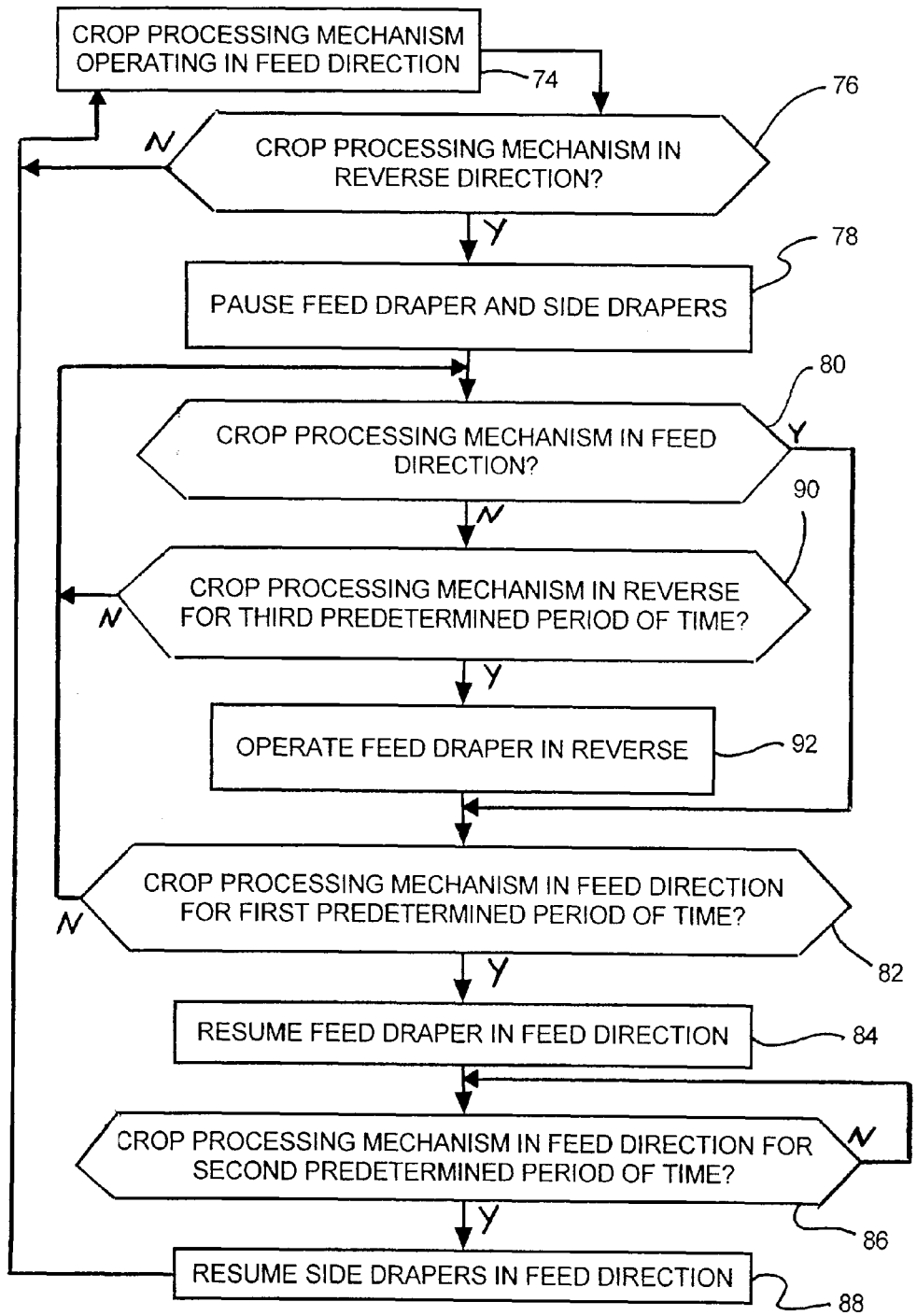
FIG. 8 is a top level flow diagram including the method of operation of the draper header during and after the clean out operation.
Figure 9:
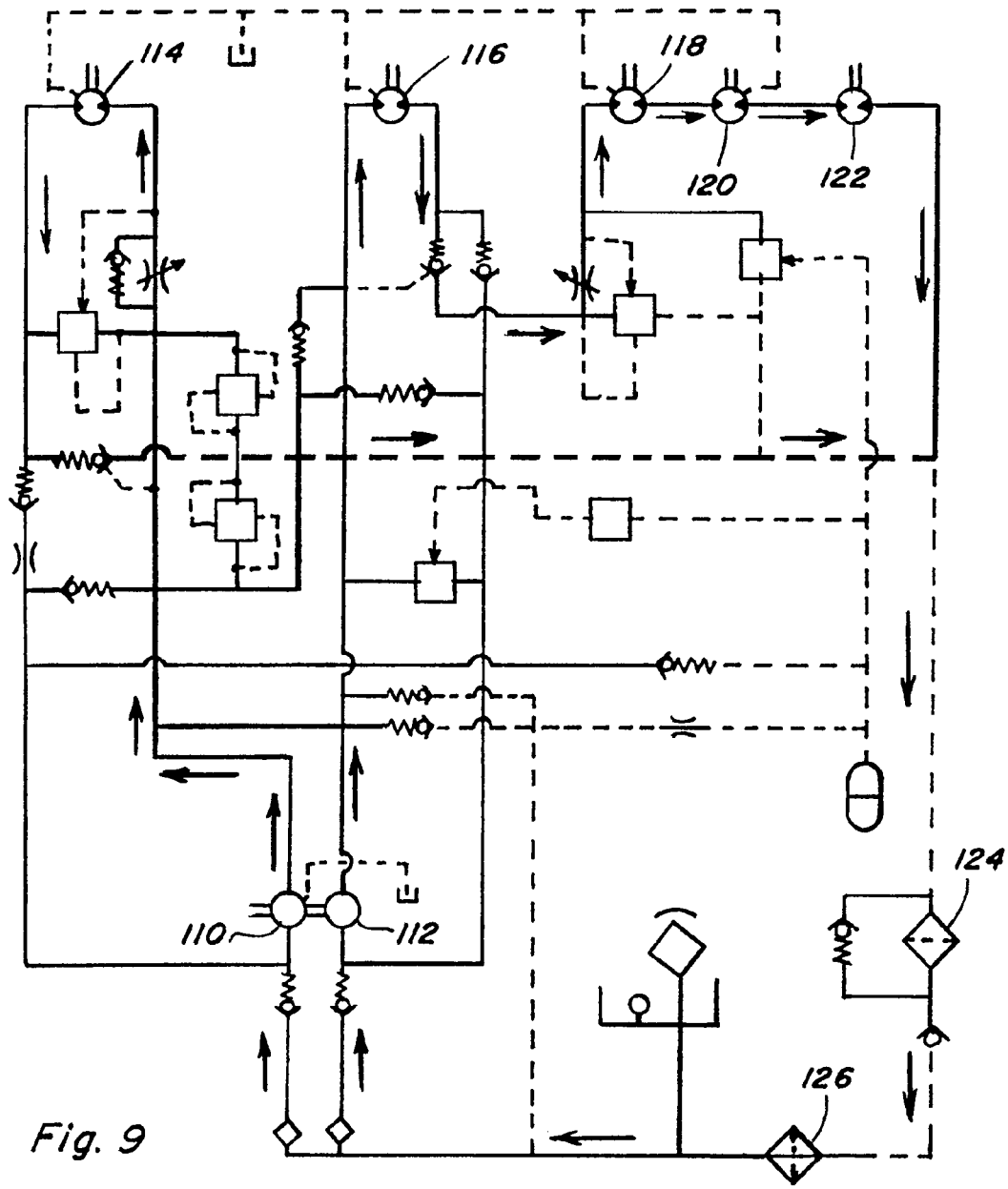
FIG. 9 is a simplified hydraulic circuit showing hydraulic fluid flow in the forward direction indicating the crop processing mechanism is operating in the feed direction.

According to the present invention, in response to operation of the crop processing mechanism in the reverse direction, operation of feed draper 22 and the at least one side draper 26 in the feed direction is automatically paused as seen in blocks 74, 76, and 78 of FIG. 8. Initially pausing feed draper 24 is advantageous because operation in the feed direction conveys additional cut crop material into feed mechanism 28 and/or threshing mechanism 30 interfering with the slug clean out operation, and operation in the reverse direction unnecessarily carries cut crop material off forward end 34 of header 22. Pausing the at least one side draper 26 during the clean out operation is advantageous because operation in the feed direction adds additional cut crop material to feed draper 24, and operation in the reverse direction causes cut crop material thereon to build up at the outer ends of the at least one side draper 26. So, operation of the at least one side draper 26 in either direction creates an uneven distribution of crop material and the possibility of creating a large slug of crop material that may form a new blockage when normal crop processing resumes.

After the deslugging or clean out operation, crop processing mechanism 27 is operated in the feed direction. In response to operation of crop processing mechanism 27 in the feed direction for a first predetermined period of time, operation of feed draper 24 is automatically resumed in the feed direction for conveying crop material in the feed direction as seen at blocks 80, 82 and 84 of FIG. 8 and FIGS. 5 and 6. In response to operation of crop processing mechanism 27 in the feed direction for a second predetermined period of time, longer than the first predetermined period of time, operation of the at least one side draper 26 is automatically resumed in the feed direction for conveying crop material in the feed direction toward feed draper 24 as seen in blocks 86 and 88 of FIG. 8 and FIGS. 6 and 7. In addition, in response to operation of crop processing mechanism 27 in the reverse direction for a third predetermined period of time, feed draper 24 is automatically operated in the reverse direction to convey crop material thereon, including slug 70 in the reverse direction as seen in blocks 90 and 92 of FIG. 8 and FIG. 4.

According to a preferred feature of the invention, when crop processing mechanism 27 is operated in the reverse direction, feed draper remains 24 paused until crop processing mechanism 27 is operated in the feed direction for the first predetermined period of time, indicating the slug clean out operation broke apart or compacted the slug sufficiently for normal crop processing to resume. In this case, feed draper 24 resumes operation in feed direction F, and, after the second predetermined period of time, the at least one side draper 26 resumes operation in feed direction C and D.

Figure 4:
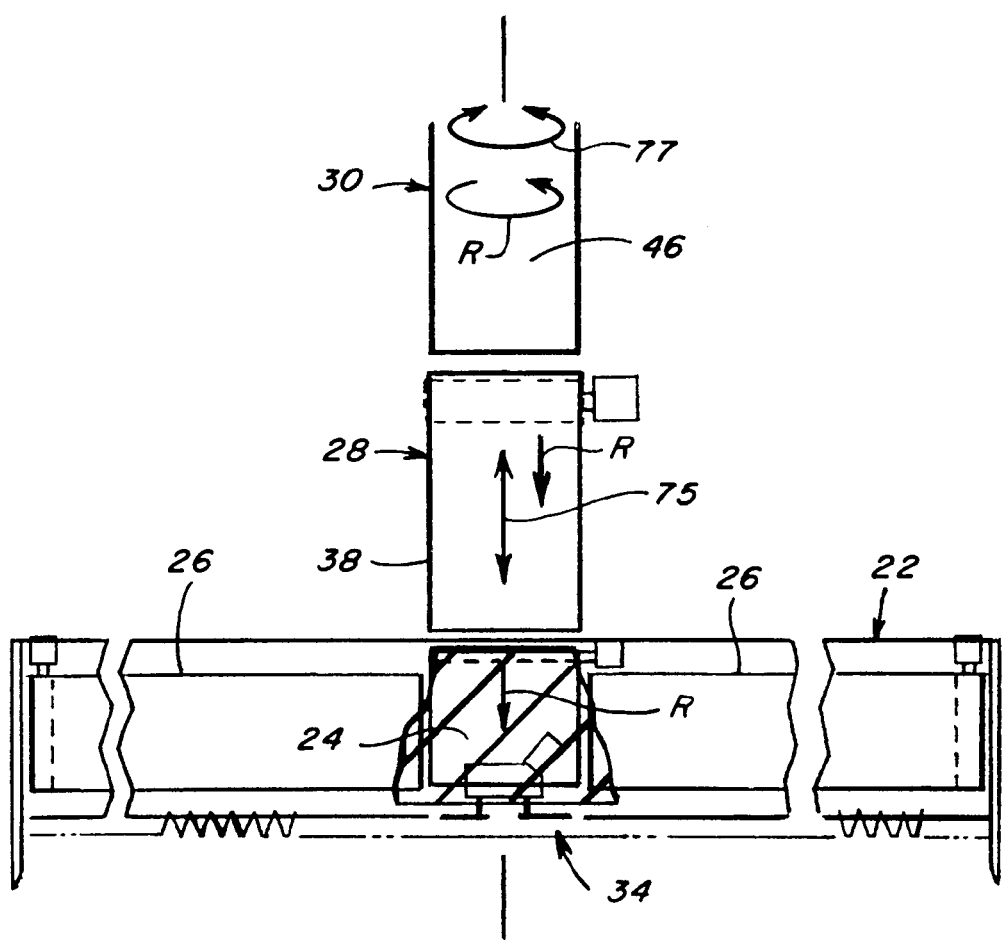
FIG. 4 is a simplified top view of the header, the feed mechanism, and a portion of the threshing mechanism of the combine of FIG. 1, illustrating operation of the feed draper in the reverse direction in response to operation of the feed mechanism in the reverse direction for the third predetermined period of time representative of a clean out operation in which the slug of crop material discharged onto the feed draper is conveyed from the forward end of the header.
Figure 5:
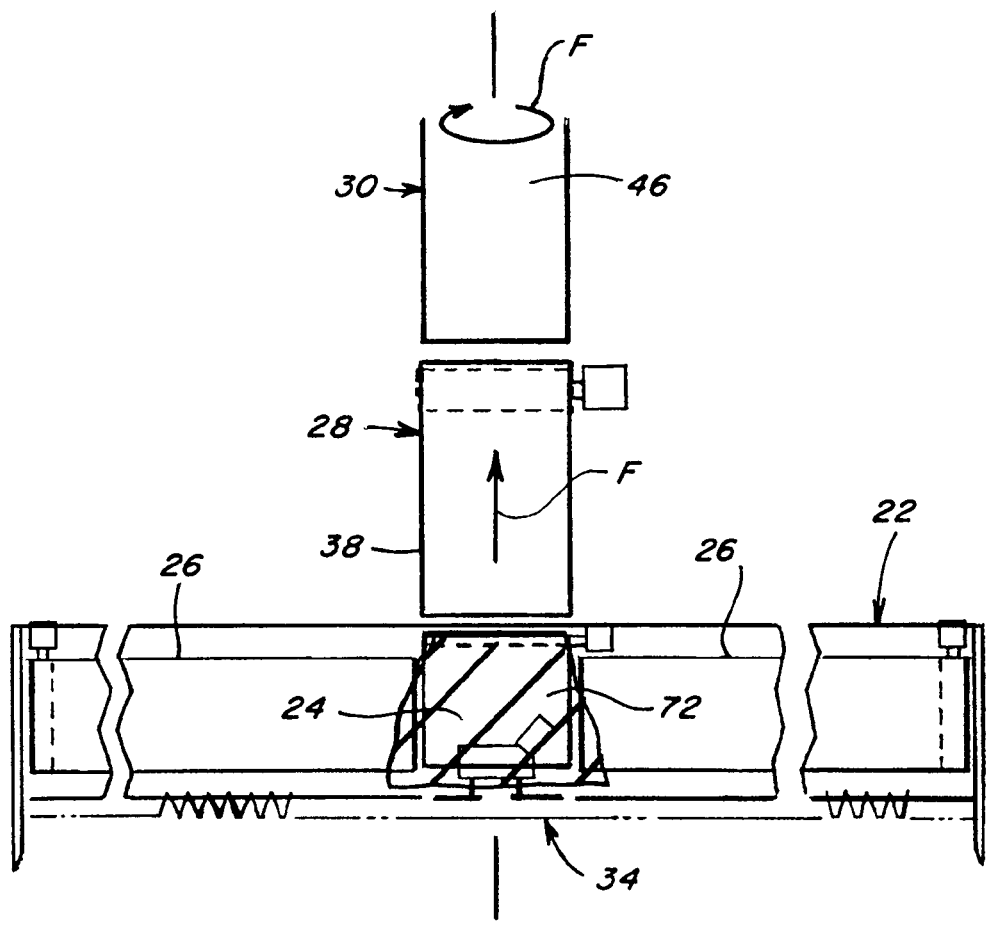
FIG. 5 is a simplified top view of the header, the feed mechanism, and a portion of the threshing mechanism of the combine of FIG. 1, illustrating the operation of the feed mechanism in the feed direction during the first predetermined period of time after a clean out operation.
Figure 6:
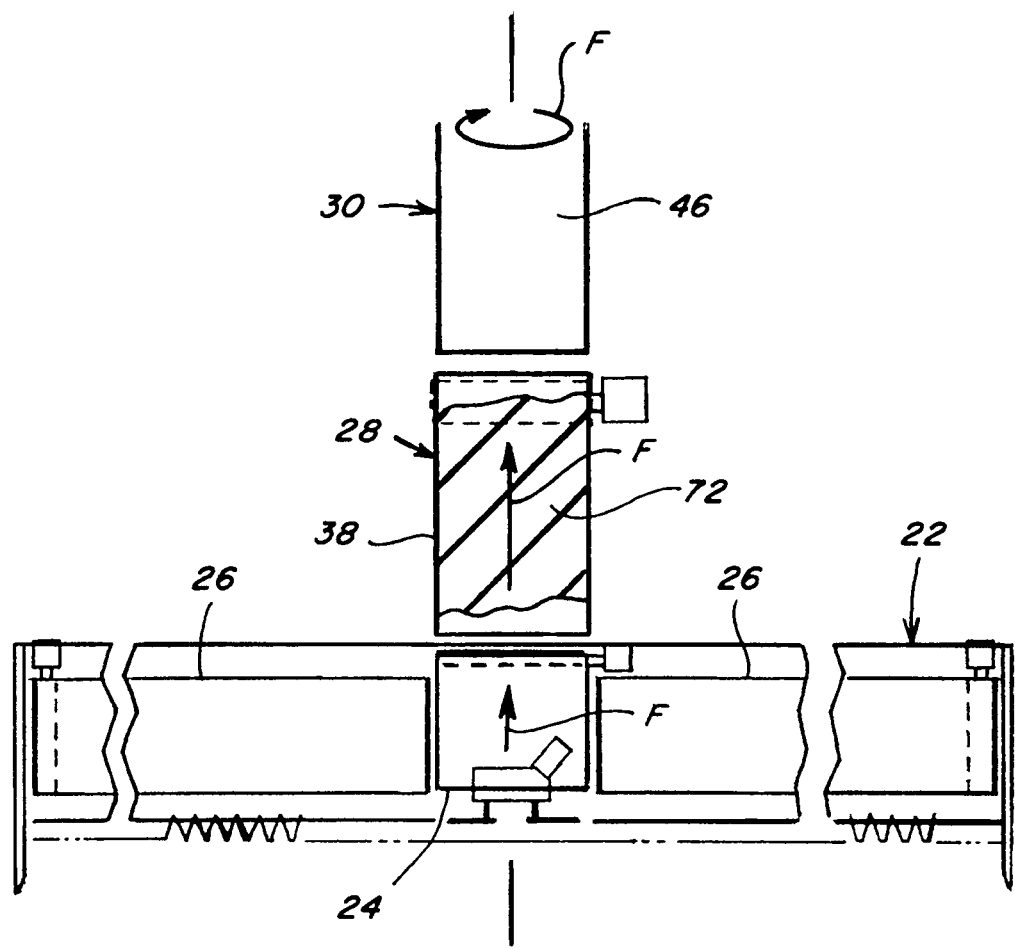
FIG. 6 is a simplified top view of the header, the feed mechanism, and a portion of the threshing mechanism of the combine of FIG. 1, illustrating the operation of the feed mechanism in the feed direction after the first predetermined period of time and during the second predetermined period of time after the clean out operation.
Figure 7:
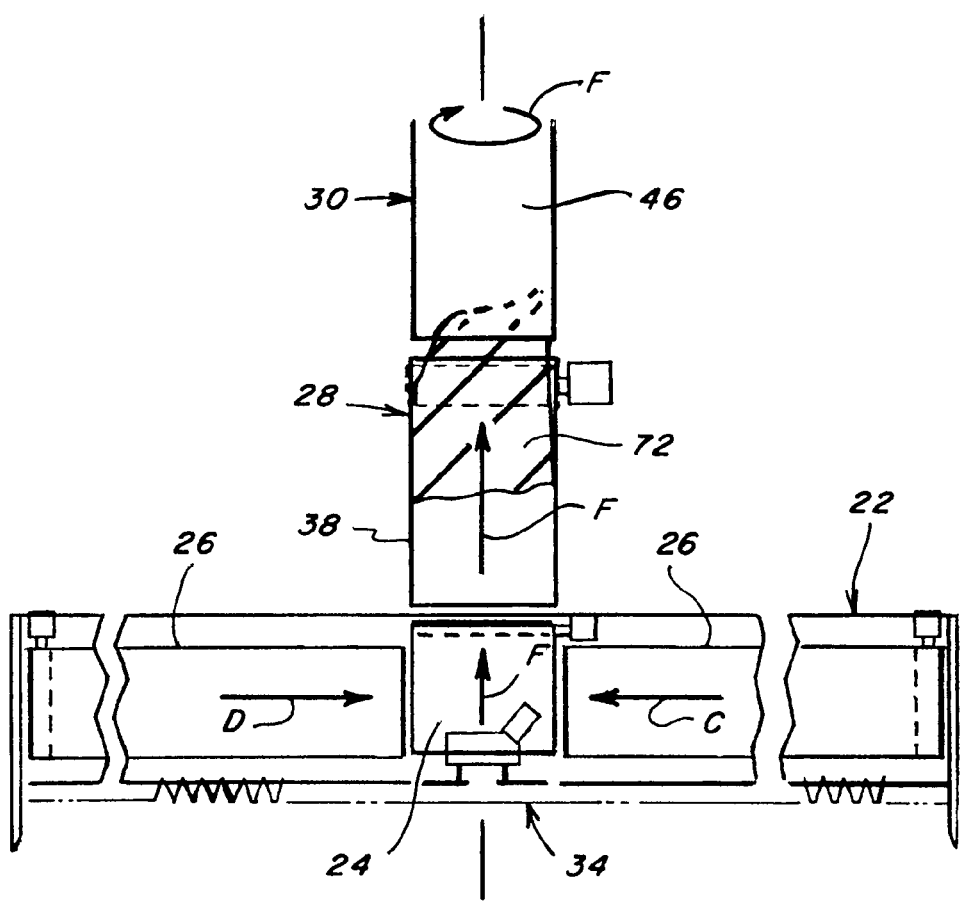
FIG. 7 is a simplified top view of the header, the feed mechanism, and a portion of the threshing mechanism of the combine of FIG. 1, illustrating the operation of the feed mechanism in the feed direction after the second predetermined period of time after the clean out operation.

Alternately, in at least one slug clean out operation, feed draper 24 remains paused until crop processing mechanism 27 is operated in reverse direction R for the third predetermined period of time sufficient for depositing slug 70 onto feed draper 24 as illustrated in FIG. 4. In response to this case, feed draper 24 resumes operation in reverse direction R until slug 70 is discharged from the front or forward end 34 of header 22.

According to a preferred aspect of the invention, the first predetermined period of time is sufficient to allow crop processing mechanism 27 to process at least a portion of the crop material therein. This aspect is advantageous because when normal crop processing stops, feed draper 24 has cut crop material thereon en route to feed mechanism 28. If feed draper 24 remains paused during the slug clean out process, the cut crop material remains on feed draper 24 when it resumes operation in feed direction F. The first predetermined period of time allows crop processing mechanism 27 to process any crop material therein including the crop material that was previously part of slug 70 prior to introduction of the cut crop material on feed draper 24.

According to another preferred aspect of the invention, the second predetermined period of time is sufficient to allow feed draper 24 to convey at least a portion of crop material thereon to feed mechanism 28. This aspect is also advantageous because when normal crop processing stops, the at least one side draper 26 has cut crop material thereon en route to feed draper 24 that remains thereon when operation of the at least one side draper resumes. The second predetermined period of time allows crop processing mechanism 27 to process any crop material therein and any crop material conveyed from feed draper 24 including the crop material that was previously part of slug 70 prior to introduction of the cut crop material on the at least one side draper 26.

Referring also to FIGS. 4 through 7, according to a preferred feature of the invention, at least one slug clean out operation includes operation of crop processing mechanism 27 in alternating reverse and feed directions for variable durations represented by arrows 75 and 77 in FIG. 4. Accordingly, the first predetermined period of time is longer than the variable durations of operation of crop processing mechanism 27 in the feed direction F, and the third predetermined period of time is longer than the variable durations of operation of crop processing mechanism 27 in the reverse direction R during the at least one slug clean out operation. This will prevent the header from misinterpreting the repeated reversals of direction of crop processing mechanism 27 during the slug clean out operation as indications that the slug clean out operation is complete or the slug has been discharged onto feed draper 24.

According to yet another preferred feature of the invention, the variable durations of operation of crop processing mechanism 27 in feed direction F and reverse direction R are predetermined.

According to yet another preferred feature of the invention, the variable durations of operation of crop processing mechanism 27 in feed direction F and reverse direction R are selected by an operator.

According to yet another preferred feature of the invention, the variable durations of operation of crop processing mechanism 27 in feed direction F and reverse direction R are automatically determined by parameters of the at least one slug clean out operation.

According to yet another preferred aspect of the invention, the header further includes an auger 66 (FIG. 3) disposed near a rear end of the feed draper, and operation of auger 66 is paused with the at least one side draper 26 and resumed after the second predetermined period of time.

Referring now also to FIGS. 9 through 14, for a representative hydraulic implementation of one of the preferred embodiments of the system of the invention. During normal crop processing, illustrated by FIG. 9, hydraulic fluid flows according to the arrows from fluid pumps 110 and 112, to a knife drive motor 114, a feed draper motor 116, side draper motors 118 and 120, and an auger motor 122, and then returns through a filter 124 and a cooler 126.

Figure 10:
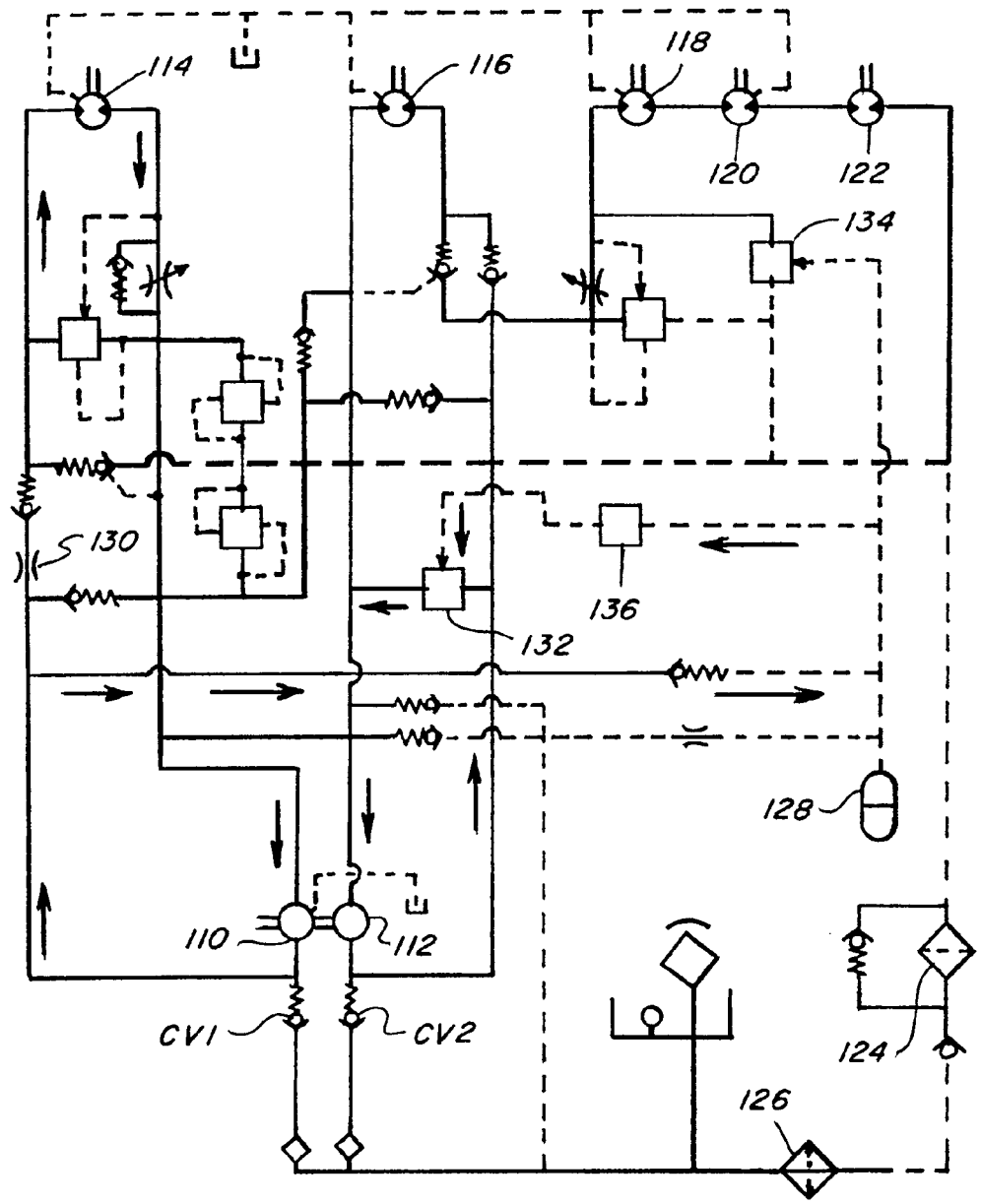
FIG. 10 is a simplified hydraulic circuit showing the operation of the fluid pumps in the reverse direction in response to operation of the crop processing mechanism in the reverse direction indicative of the slug clean out operation.

Referring also to FIG. 10, if crop processing mechanism 27, including feed mechanism 28 and/or threshing mechanism 30, are operated in reverse to clean out slug 70, fluid flow is reversed in pumps 110 and 112. Filter 124 and cooler 126 are isolated from the reverse hydraulic fluid flow with various check valves, including check valves CV1 and CV2. When fluid flow is reversed, as shown by the arrows in FIG. 10, an accumulator 128 is charged with hydraulic fluid from pump 110 using backpressure created by an orifice 130. As long as there is sufficient pressure in accumulator 128, a feed draper valve 132 and a side draper valve 134 remain energized. When energized, feed draper valve 132 diverts hydraulic fluid away from feed draper motor 118, and side draper valve 132 diverts oil away from side draper motors 118 and 120 and auger motor 122. Knife drive motor 114 is always active during forward and reverse hydraulic fluid flow, which is desirable.

Figure 11:
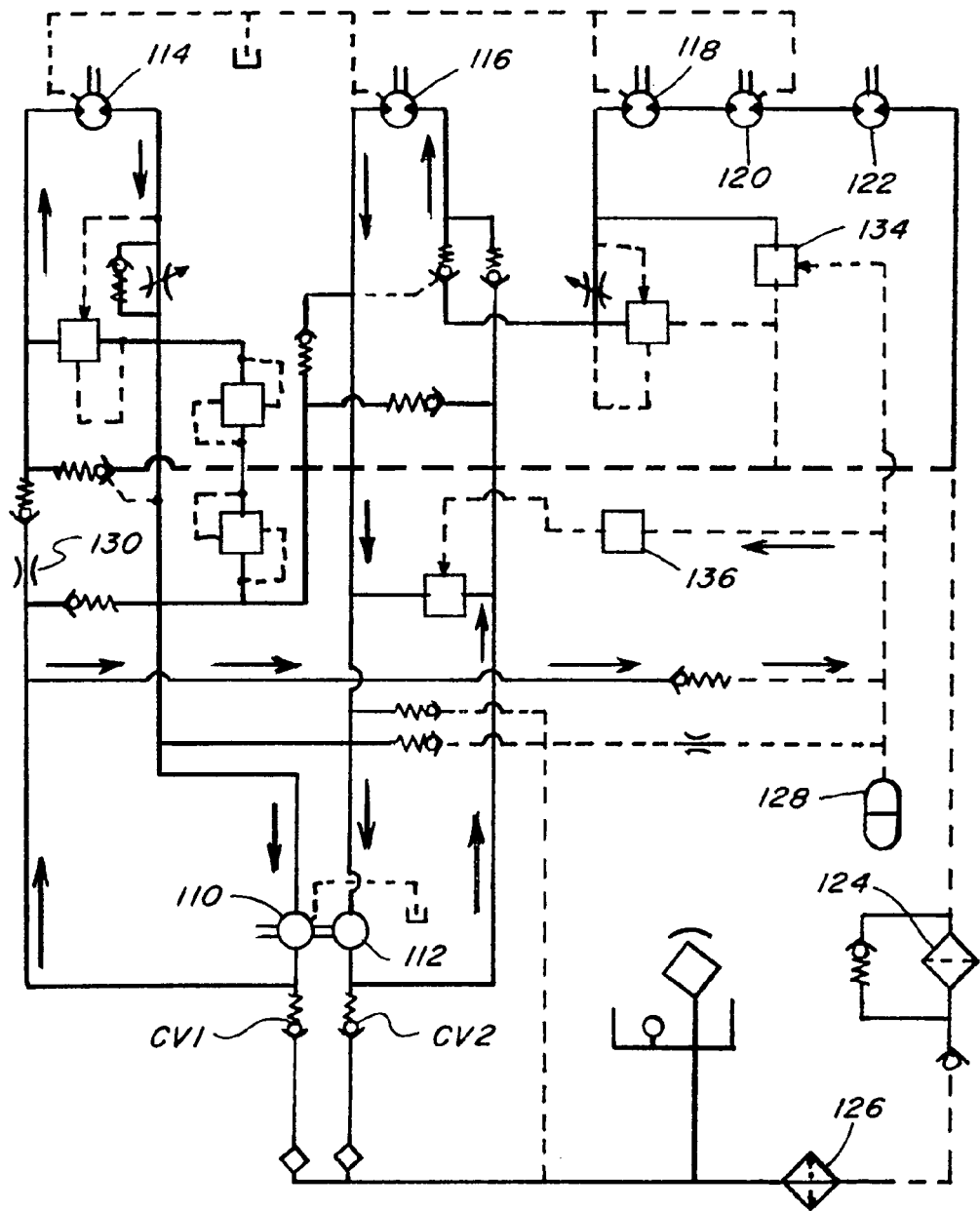
FIG. 11 is a simplified hydraulic circuit showing operation of the hydraulic pumps in the reverse direction in response to operation of the crop processing mechanism in the reverse direction after the third predetermined period of time indicative of discharging the slug of crop material from the forward end of the header.

Referring also to FIG. 11, when crop processing mechanism 27 is operated in the reverse direction for the third predetermined period of time, valve 136 is selected to allows operation of feed draper 24 in reverse direction R. Valve 136 isolates accumulator 128 from the path of feed draper motor 116, regardless of the pressure in accumulator 128. Valve 134 remains in the fluid path with side drapers 26 and auger 66 to isolate them from the reverse fluid flow so they remained paused as shown in FIG. 11. Valve 136 may also be selected by the operator to determine if feed draper 24 operates during the slug clean out mode.

Figure 12:
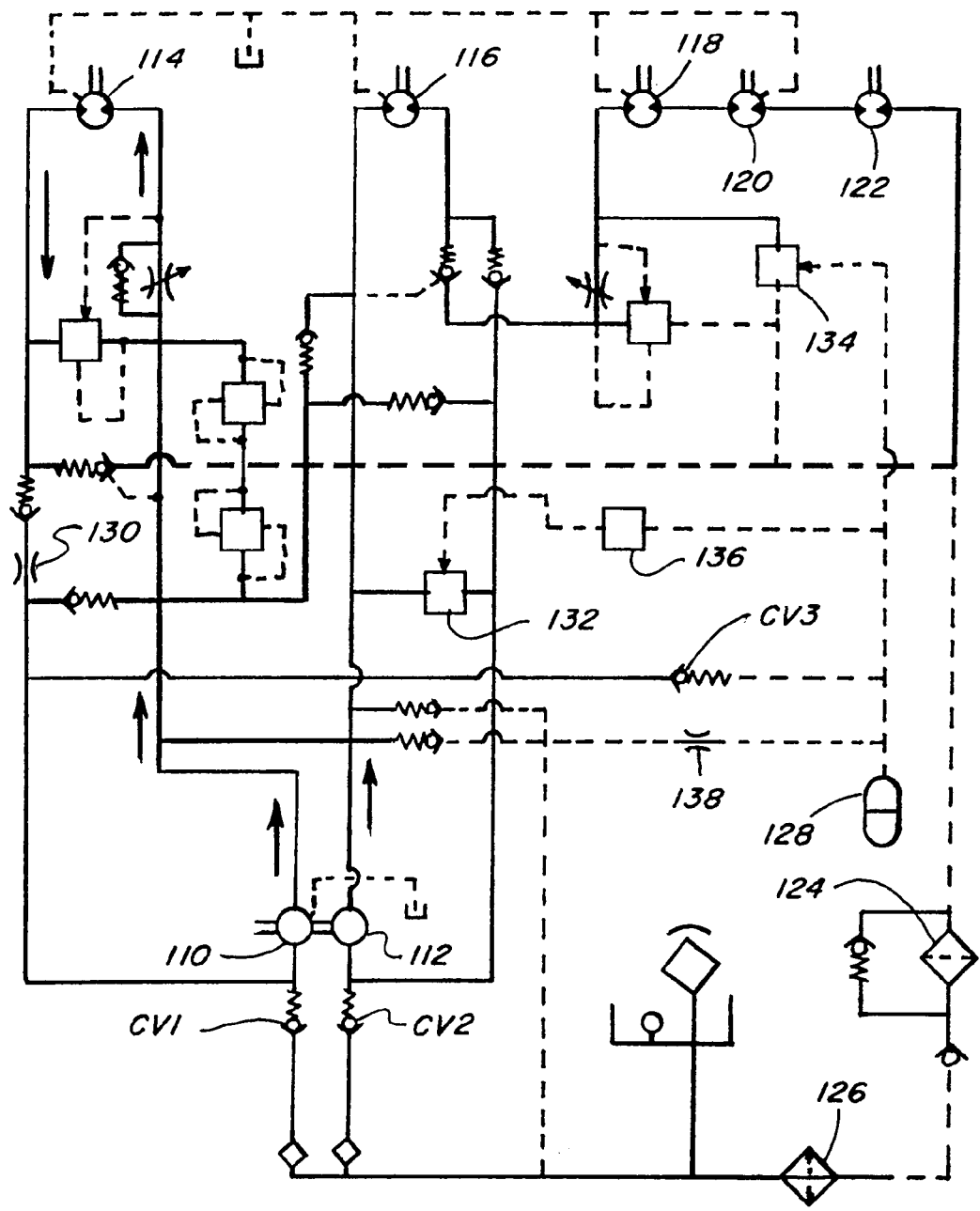
FIG. 12 is a simplified hydraulic circuit showing operation of the fluid pumps in the forward direction during the first predetermined period of time wherein fluid flow remains diverted from the feed draper and side drapers following a slug clean out operation.
Figure 13:
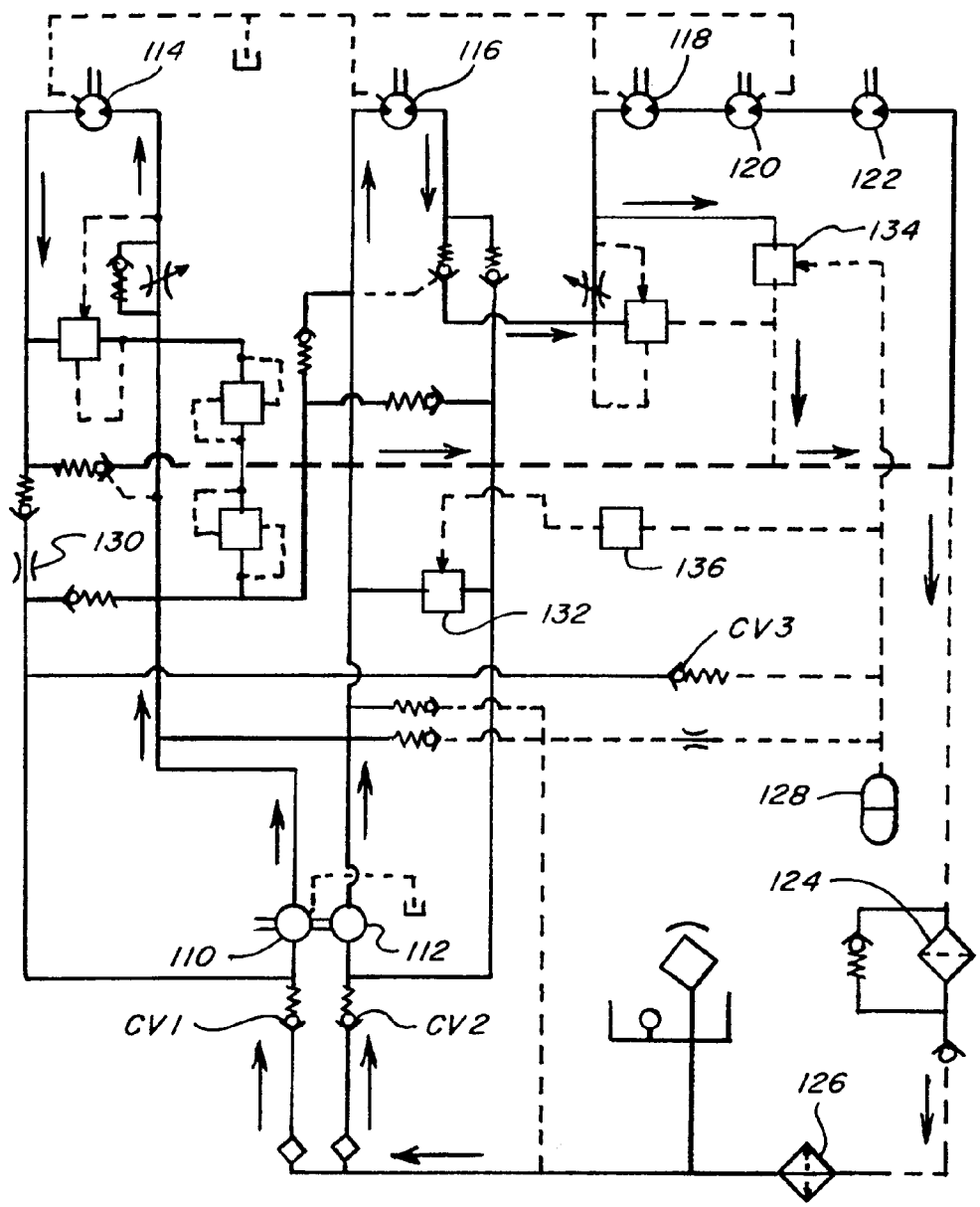
FIG. 13 is a simplified hydraulic circuit showing operation of the fluid pumps in the forward direction after the first predetermined period of time wherein operation of the feed draper in the feed direction is resumed following the slug clean out operation.
Figure 14:
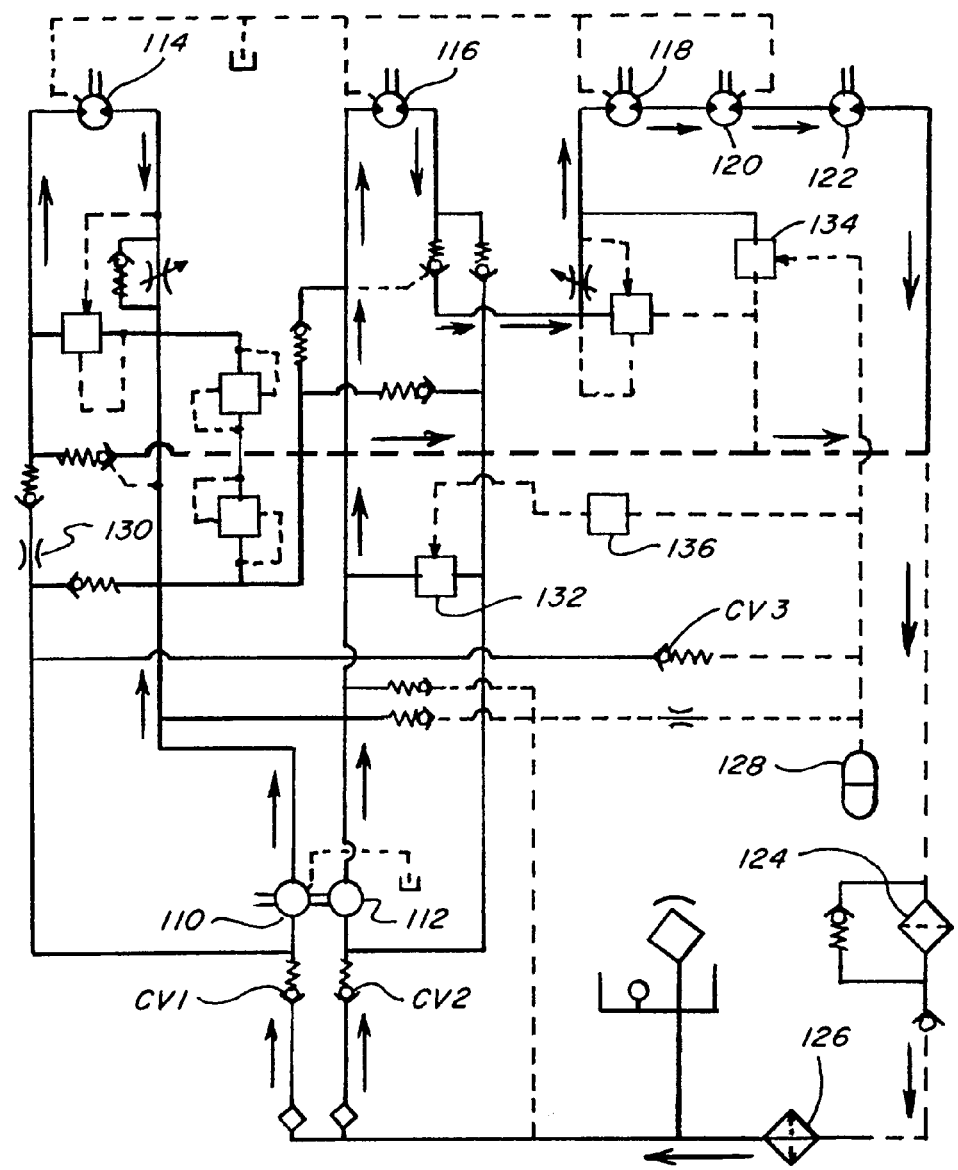
FIG. 14 is a simplified hydraulic circuit showing operation of the fluid pumps in the forward direction after the second predetermined period of time wherein operation of the side drapers in the feed direction is resumed following a slug clean out operation.

Referring also to FIGS. 12 through 14, when crop processing mechanism is operated in feed direction F for the first predetermined period of time, fluid pumps are operated in the forward direction. The fluid pressure stored in accumulator 128 and held by check valve CV3, but immediately begins to bleed down through orifice 138. As seen in FIG. 13, once the pressure in accumulator 128 reaches a spring rating of feed draper valve 132, it returns to its neutral position, and feed draper motor 116 resumes operation in the feed direction. Similarly, as seen in FIG. 14, once the pressure in accumulator 128 reaches a spring rating of side draper valve 134, it returns to its neutral position, and side draper motors 118 and 120 and auger motor 112 resume operation. The spring rating in feed draper valve 132 is set higher than that of side draper valve 134 so that the feed draper 24 will engage before the at least one side draper 26. The spring ratings in valves 132 and 134 correspond to delays that may be incorporated into the first predetermined period of time and the second predetermined period of time, respectively. For example, the time required for the fluid pressure in accumulator 128 to reach the spring rating of feed draper valve 132 may be added to the first predetermined period of time, and the time required for the fluid pressure in accumulator 128 to reduce further to reach the spring rating of side draper valve 134 may be added to the second predetermined period of time. Again, these delays allow crop material in crop processing mechanism 27 to process prior to conveyance of additional crop material from feed draper 24 and/or the at least one side draper 26.

Preferred embodiments of the system of the invention comprise not only hydraulic embodiments but also electromechanical embodiments.

In light of all the foregoing, it should thus be apparent to those skilled in the art that there has been shown and described a system and method for operation of a draper header during and after a slug clean out operation. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method of operation of a draper header including a feed draper and at least one side draper during comprising the steps of
    pausing operation of the feed draper and the at least one side draper in the feed direction by controlling at least one control valve of a valve system of the draper header to divert flow from at least one motor configured to drive the feed draper and at least one side draper in response to operation of a crop processing mechanism of an attached harvester in the reverse direction;
    resuming operation of the feed draper by controlling the valve arrangement to return flow to the feed draper motor in the feed direction for conveying crop material in the feed direction in response to operation of the crop processing mechanism in the feed direction for a first predetermined period of time;
    resuming operation of the at least one side draper in the feed direction for conveying crop material in the feed direction toward the feed draper by adjusting the control valve to return flow to the at least one side draper motor in response to operation of the crop processing mechanism in the feed direction for a second predetermined period of time, longer than the first predetermined period of time; and wherein the operation of the feed draper motor and the at least one side draper motor is controlled using an accumulator and a control valve within the valve arrangement.

2. The method of claim 1 wherein the feed draper and the at least one side draper pause operation in the feed direction in response to operation of the crop processing mechanism in the reverse direction and will not resume operation in the feed direction until the crop processing mechanism is operated in the feed direction for the first predetermined period of time.

3. The method of claim 1 wherein the first predetermined period of time is sufficient to allow the crop processing mechanism to process at least a portion of the crop material therein.

4. The method of claim 1 wherein the second predetermined period of time is sufficient to allow the feed draper to convey at least a portion of the crop material thereon to the crop processing mechanism.

5. The method of claim 1 wherein at least one slug clean out operation includes operation of the crop processing mechanism in alternating reverse and feed directions for variable durations and the first predetermined period of time is longer than the variable durations of operation in the feed direction and the third predetermined period of time is longer than the variable durations of operation in the reverse direction during the at least one slug clean out operation.

6. The method of claim 5 wherein the variable durations of operation of the crop processing mechanism in the feed direction and the reverse direction are predetermined.

7. The method of claim 5 wherein the variable durations of operation of the crop processing mechanism in the feed direction and the reverse direction are selected by an operator.

8. The method of claim 5 wherein the variable durations of operation of the crop processing mechanism in the feed direction and the reverse direction are automatically determined by parameters of the at least one slug clean out operation.

9. The method of claim 1 wherein at least one slug clean out operation includes operating the crop processing mechanism in the reverse direction for the third predetermined period of time sufficient for depositing a slug of crop material from the crop processing mechanism onto the feed draper and operation of feed draper in the reverse direction until the slug of crop material is discharged from a forward end of the header.

10. The method of claim 1 wherein the header further includes an auger disposed near a rear end of the feed draper, and operation of the auger is resumed after the second predetermined period of time.

11. The method of claim 10 wherein operation in the feed direction conveys the cut crop material sidewardly on the at least one side draper to the feed draper, along the feed draper to a feed conveyor within a feeder housing of the feed mechanism, through feed mechanism to the threshing mechanism including a rotor and concave, through the threshing mechanism for further cleaning and processing in the agricultural harvesting machine.

12. A system for operation of a draper header of an agricultural harvesting machine comprising:
a feed draper and at least one side draper connected to a header frame, wherein the header frame is adapted for attachment to the agricultural harvesting machine, the harvesting machine comprising controller and a crop processing mechanism configured for operation in a reverse direction and a feed direction for movement of crop material in a reverse direction and a feed direction, respectively,
a drive system including a control arrangement connected to the harvester and at least two reversible drive elements in operable communication with a reversible feed draper motor and at least one side draper motor, the drive system configured and operable such that forward operation of the feed draper motor operates the feed draper in the feed direction, and wherein reverse operation of the feed draper motor operates the feed draper in the reverse direction, and forward operation of the at least one side draper motor operates the at least one side draper motor in the feed direction;
the control arrangement is configured for connection with the harvester and the draper motor and at least one side draper motor, the control arrangement further configured to:
divert power from the feed draper motor and the at least one side draper in the feed direction in response to operation of the crop processing mechanism in the reverse direction;
return power to the feed draper motor in the feed direction for conveying crop material in the feed direction in response to operation of the crop processing mechanism in the forward direction for a first predetermined period of time;
return power to the at least one side draper in the feed direction for conveying crop material in the feed direction toward the feed draper in response to operation of the crop processing mechanism in the forward direction for a second predetermined period of time, longer than the first predetermined period of time; and
operate the feed draper in the reverse direction for movement of crop material thereon in the reverse direction in response to operation of the crop processing mechanism in the reverse direction for a third predetermined period of time.

13. The system of claim 12 wherein the feed draper and the at least one side draper pause operation in the feed direction in response to operation of the crop processing mechanism in the reverse direction and will not resume operation in the feed direction until the crop processing mechanism is operated in the feed direction for the first predetermined period of time.

14. Then system of claim 12 wherein the first predetermined period of time is sufficient to allow the crop processing mechanism to process at least a portion of the crop material therein.

15. The system of claim 12 wherein the second predetermined period of time is sufficient to allow the feed draper to convey at least a portion of the crop material thereon to the crop processing mechanism.

16. The system of claim 12 wherein the drive system comprises a hydraulic system, the control arrangement comprises control valves, and the drive elements comprise reversible fluid sources operable in a forward and a reverse direction, disposed in fluid paths with the reversible feed draper motor operable in the forward and the reverse directions, and the at least one side draper motor, and operation of the crop processing mechanism in the reverse direction causes operation of the reversible fluid sources in the reverse direction until the crop processing mechanism is operated in the feed direction for the first predetermined period of time.

17. The system of claim 16 wherein a first control valve disposed in the fluid path isolates fluid flowing in the reverse direction from the feed draper motor and a second control valve disposed in the fluid path isolates fluid flowing in the reverse direction from the at least one side draper motor for pausing operation, in the feed direction, of the feed draper and the at least one side draper, respectively.

18. The system of claim 16 wherein upon operation of the reversible fluid sources in the forward direction, the first control valve allows fluid flow to the feed draper motor after a first delay corresponding to at least one property of the first control valve and the second control valve allows fluid flow to the at least one side draper motor after a second, longer delay corresponding to at least one property of the second control valve.

19. The system of claim 16 wherein a third control valve disposed in the fluid path directs fluid flowing in the reverse direction to the feed draper motor for operation of the feed draper motor in the reverse direction for operation of the feed draper in the reverse direction.

20. The system of claim 12 wherein the drive system and the control arrangement comprise electromechanical elements.

* * * * *